(12) United States Patent
Chen et al.

(10) Patent No.: US 9,961,185 B2
(45) Date of Patent: May 1, 2018

(54) ESTABLISHING AN AUTHENTICATED WIRELESS CONNECTION BETWEEN SHORT-RANGE WIRELESS TERMINALS MORE CONVENIENTLY

(71) Applicant: International Business Machines Corporation, Armonk, NY (US)

(72) Inventors: Yan Chen, Beijing (CN); Xiao He, Beijing (CN); Kuang Hu, Beijing (CN); Guo Jun Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/784,420

(22) Filed: Oct. 16, 2017

(65) Prior Publication Data
US 2018/0041621 A1 Feb. 8, 2018

Related U.S. Application Data

(63) Continuation of application No. 13/405,316, filed on Feb. 26, 2012, which is a continuation of application
(Continued)

(30) Foreign Application Priority Data

Oct. 29, 2010 (CN) .......................... 2010 1 0551194

(51) Int. Cl.
*H04W 12/06* (2009.01)
*H04M 1/725* (2006.01)
(Continued)

(52) U.S. Cl.
CPC ...... *H04M 1/7253* (2013.01); *G06F 3/04883* (2013.01); *H04L 63/0492* (2013.01);
(Continued)

(58) Field of Classification Search
CPC . G06F 3/04883; H04L 63/0492; H04L 63/08; H04W 12/06; H04M 1/7253
See application file for complete search history.

(56) References Cited

U.S. PATENT DOCUMENTS 7,453,418 B2 11/2008 Palmquist
7,532,196 B2 * 5/2009 Hinckley ................ G06F 3/011
345/156
(Continued)

FOREIGN PATENT DOCUMENTS

CN 101378270 A 3/2009

OTHER PUBLICATIONS

Hinckley et al., "Stitching: Pen Gestures that Span Multiple Displays," http://www.webcitation.org/query?url=http://www.dgp.toronto.edu/-bonzo/docs/MSR_Stitching.pdf&date=2010-07-30), ACM Int'l Working Conf. on Advanced Visual Interfaces, Gallipoli (Lecce), Italy, May 25-28, 2004, pp. 23-31.

Primary Examiner — Steven Lim
Assistant Examiner — Mancil Littlejohn, Jr.
(74) Attorney, Agent, or Firm — Winstead, P.C.

(57) ABSTRACT

A method, system and computer program product for establishing a wireless connection based on a touch screen of a wireless device. The wireless device includes a slide-out processing section for determining, in response to a slide-out from an edge of the touch screen, a first slide-out parameter for determining by the other wireless device an object to be connected, and broadcasting the first slide-out parameter. The wireless device further includes a slide-in processing section for determining a slide-in parameter in response to a slide-in from the edge of the touch screen and reception of a second slide-out parameter directionally transmitted from the other wireless device. Furthermore, if the determined slide-in parameter matches the second slide-out parameter, then the slide-in processing section establishes a wireless
(Continued)

connection between the wireless device and the other wireless device. As a result, an authenticated wireless connection between short-range wireless terminals can be established more conveniently.

14 Claims, 10 Drawing Sheets

Related U.S. Application Data

No. 13/276,930, filed on Oct. 19, 2011, now Pat. No. 8,692,789.

(51) Int. Cl.
*H04L 29/06* (2006.01)
*G06F 3/0488* (2013.01)

(52) U.S. Cl.
CPC .............. *H04L 63/08* (2013.01); *H04W 12/06* (2013.01); *H04M 2250/22* (2013.01)

(56) References Cited

U.S. PATENT DOCUMENTS

| | | | |
|---|---|---|---|
| 7,636,794 B2 * | 12/2009 | Ramos | G06F 3/017 |
| | | | 709/201 |
| 8,762,863 B2 | 6/2014 | Nomura | |
| 2005/0093868 A1 | 5/2005 | Hinckley | |
| 2007/0124503 A1 | 5/2007 | Ramos et al. | |
| 2008/0285626 A1 | 11/2008 | Claus et al. | |
| 2009/0031258 A1 | 1/2009 | Arrasvuori et al. | |
| 2009/0140986 A1 | 6/2009 | Karkkainen et al. | |
| 2010/0149090 A1 | 6/2010 | Morris et al. | |
| 2011/0231783 A1 * | 9/2011 | Nomura | G06F 3/0488 |
| | | | 715/761 |
| 2012/0206319 A1 | 8/2012 | Lucero et al. | |

* cited by examiner

FIG. 2
(RELATED ART)

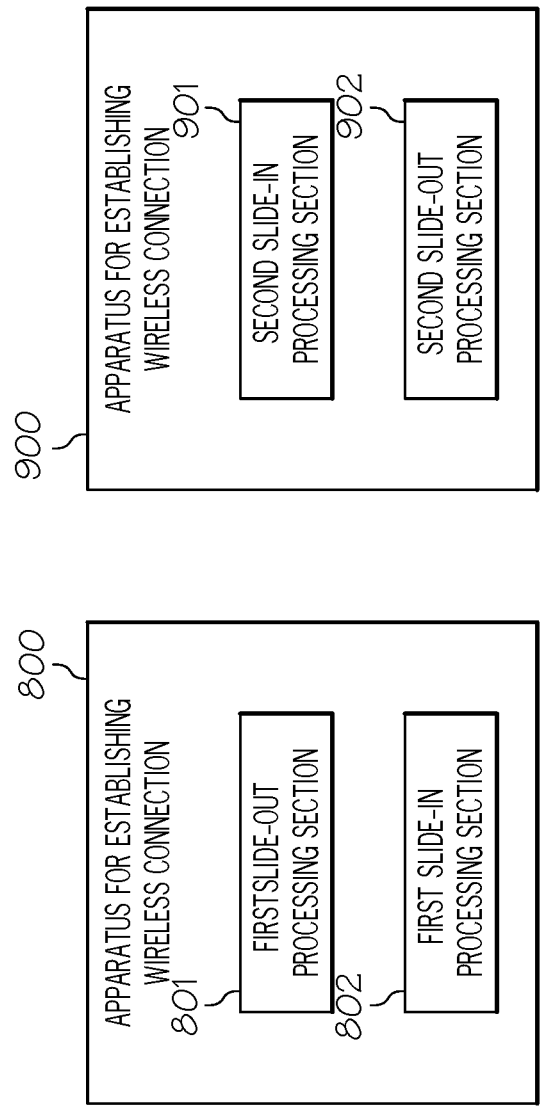

ESTABLISHING AN AUTHENTICATED WIRELESS CONNECTION BETWEEN SHORT-RANGE WIRELESS TERMINALS MORE CONVENIENTLY

TECHNICAL FIELD

The present invention relates to wireless communication, and more particularly, to establishing an authenticated wireless connection between short-range wireless terminals more conveniently.

BACKGROUND

Nowadays, with the development of wireless communication techniques, the short-range wireless communication technologies, such as Bluetooth®, Wi-Fi® P2P and ultra-wideband (UWB) have become widespread, and the wireless connection technologies between short-range wireless communication terminals, such as Bluetooth®, Wi-Fi® P2P and UWB, present increasing importance.

The users of short-range wireless communication terminals, e.g., mobile phone, MP4 player, portable computer, personal digital assistant (PDA), or wireless TV, are usually located within a small range (e.g., several meters) spaced apart from each other.

To prevent a user who is not authorized to access a certain wireless terminal, it is required to establish an authenticated wireless connection between the wireless terminals of short-range wireless communication. Generally, it is established by the following processes: (a) search for a target wireless device for the connection; and (b) pair the targeted wireless device with the present wireless device. Process (a) is mainly directed to the determination of the target to be connected, and process (b) is mainly directed to the authentication.

FIG. 1 illustrates a general process of establishing an authenticated wireless connection between short-range wireless terminals.

Referring to FIG. 1, assume that wireless device B 102 needs to establish an authenticated wireless connection with wireless device A 101.

Within a range of short-range wireless communication, each wireless device broadcasts its own device ID. In this way, each of the other wireless devices within the range of short-range wireless communication will receive the broadcasted device ID. As illustrated in step SA01, wireless device A broadcasts its own device ID.

Upon the broadcasted device ID being received, the wireless device B 102 stores the device ID in its device ID list. In step SB01, wireless device B 102 searches the device ID list for a device ID of wireless device A 101 to which it needs to be connected, and sends a connection request to wireless device A 101. At this point, it means that process (a) is completed.

In step SA02, wireless device A 101 generates a key and sends to wireless device B 102 an instruction to display "Enter Key."

In step SB02, wireless device B 102 displays "Enter Key." Since the user of wireless device B 102 and the user of wireless device A 101 are located within the range of the same short-range communication, the user of wireless device A 101 is asked for the key which is then inputted to wireless device B 102. Wireless device B 102 sends the entered key to wireless device A 101.

In step SA03, wireless device A 101 verifies whether the generated key coincides with the received key. If the generated key coincides with the received key, it means that the pairing process (b) has succeeded; consequently, a physical connection is established between wireless device A 101 and wireless device B 102. If the generated key does not coincide with the received key, then wireless device A 101 generates a key and transmits to wireless device B an instruction to display "Enter Key" in step SA02.

With the above process, if the user of wireless device B 102 is not authorized by the user of wireless device A 101, he or she will not get the key generated by wireless device A 101 and thereby cannot access wireless device A 101.

The aforementioned way to establish an authenticated wireless connection between short-range wireless terminals is disadvantageous in the following two aspects.

First, in process (a), when wireless device B 102 searches the device ID list for a target device ID, the screen will display all the device IDs received by wireless device B 102 in the range of the short-range wireless communication, as shown in FIG. 2. This possibly brings about the following problems:

1. there are too many device IDs received in the range of the short-range wireless communication, resulting in an overlong device ID list which is disadvantageous in searching;

2. since the device ID is named by the wireless device itself, there possibly exists identical device IDs representative of different wireless devices in the device ID list, so that it is unrecognizable which one is the device ID of the target wireless device, e.g., THINKSTATION as shown in FIG. 2;

3. the device ID list may include a long ID which has poor readability and is inconvenient for the use to memorize and search, e.g., Michael Johnson chemical professor test's MacBook Pro as shown in FIG. 2;

4. the device ID list may include a meaningless ID name which is inconvenient for the user to memorize and search, e.g., AV57384579100179478 as shown in FIG. 2.

Second, in the process (b), for accessing wireless device A 101, the user of wireless device B 102 must obtain in advance the key generated by wireless device A 101 and then enter it to wireless device B 102, which is inconvenient for the user.

Therefore, the current method for establishing an authenticated wireless connection between short-range wireless terminals is relatively complicated and inconvenient for the user.

SUMMARY

In one embodiment of the present invention, a method for establishing a wireless connection based on a touch screen of a wireless device comprises determining a slide-in parameter in response to a slide-in from an edge of the touch screen. The method further comprises searching a list of received first slide-out parameters for a first slide-out parameter matching the determined slide-in parameter so as to determine an other wireless device matching the wireless device, where the list of first slide-out parameters includes the first slide-out parameter received by the wireless device, which is broadcasted by the other wireless device, for determining, by the wireless device, an object to be connected. The method additionally comprises determining a second slide-out parameter in response to a slide-out from the edge of the touch screen. Furthermore, the method comprises directionally transmitting, by a processor, the second slide-out parameter to a matched wireless device.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

Figure 2:
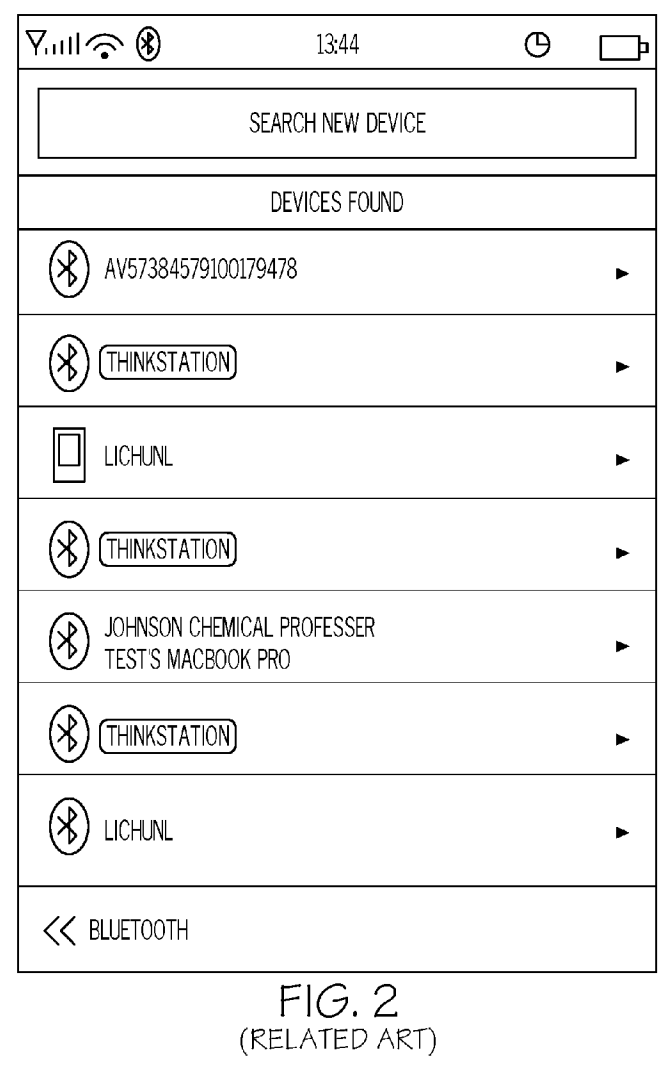

FIG. 2 illustrates an exemplary display on the screen when the wireless device searches a device ID list for a device ID of a target wireless device with which a connection is established;

FIG. 8 is a block diagram illustrating an apparatus as a connection initiating party of a wireless connection for establishing a wireless connection according to an embodiment of the present invention;

FIG. 9 is another block diagram illustrating an apparatus as a connected party of a wireless connection for establishing a wireless connection according to an embodiment of the present invention;

DETAILED DESCRIPTION

In the following discussion, a great amount of concrete details are provided to help thoroughly understand the present invention. However, it is apparent to those of ordinary skill in the art that even though there are no such concrete details, the understanding of the present invention would not be influenced. In addition, it should be further appreciated that any specific terms used below are only for the convenience of description, and thus the present invention should not be limited to only use in any specific applications represented and/or implied by such terms.

The principles of the present invention will be simply explained first.

The prior approach of establishing an authenticated wireless connection between short-range wireless terminals focuses on the performance and function of the physical display of the wireless terminals, and is not sufficiently human-friendly. That is, this approach guarantees a secure wireless connection by entering the key by the user with the use of the physical display of the wireless terminal. Such an approach makes the user's operations complicated and is relatively adapted for establishment of an authenticated wireless connection between long-distance wireless terminals. The short-range wireless communication is characterized in that the users of the short-range wireless terminals are usually located within a small range with tens of meters or even several meters spaced apart from each other, for example, in an office. Two wireless terminals to be connected to each other can be even juxtaposed side by side. Under such a circumstance, the prior approach for establishing the authenticated wireless connection is complicated and not intuitive.

Figure 4:
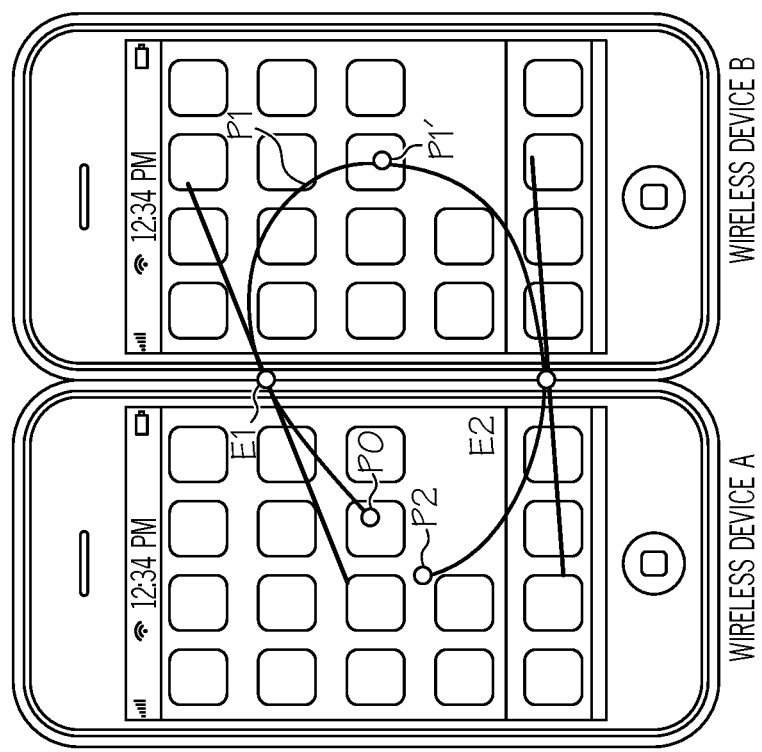
FIG. 4 illustrates operations performed by a user on the touch screen of the wireless device according to an embodiment of the present invention.

The present invention utilizes a simple and intuitive approach of establishing an authenticated wireless connection. As shown in FIG. 4, two wireless terminals to be connected with each other are placed side by side, e.g., on a desk, and then a user draws an arc from a point on a display area of one wireless terminal, passing through a display area of the other wireless device and draws back to the display area of the starting wireless terminal, thus simply establishing an authenticated wireless connection between two wireless terminals in accordance with an embodiment of the present invention. Such an approach is designed to better conform to a "human mind model." And it is relatively intuitive and convenient for the user to operate.

The present invention provides a method, computer program product and system for establishing a wireless connection based on a touch screen of a wireless device and the wireless device. The term "touch screen," as used herein, generally refers to any apparatus capable of sensing touch, movement, approaching and the like of an object such as a finger or a stylus.

Figure 1:
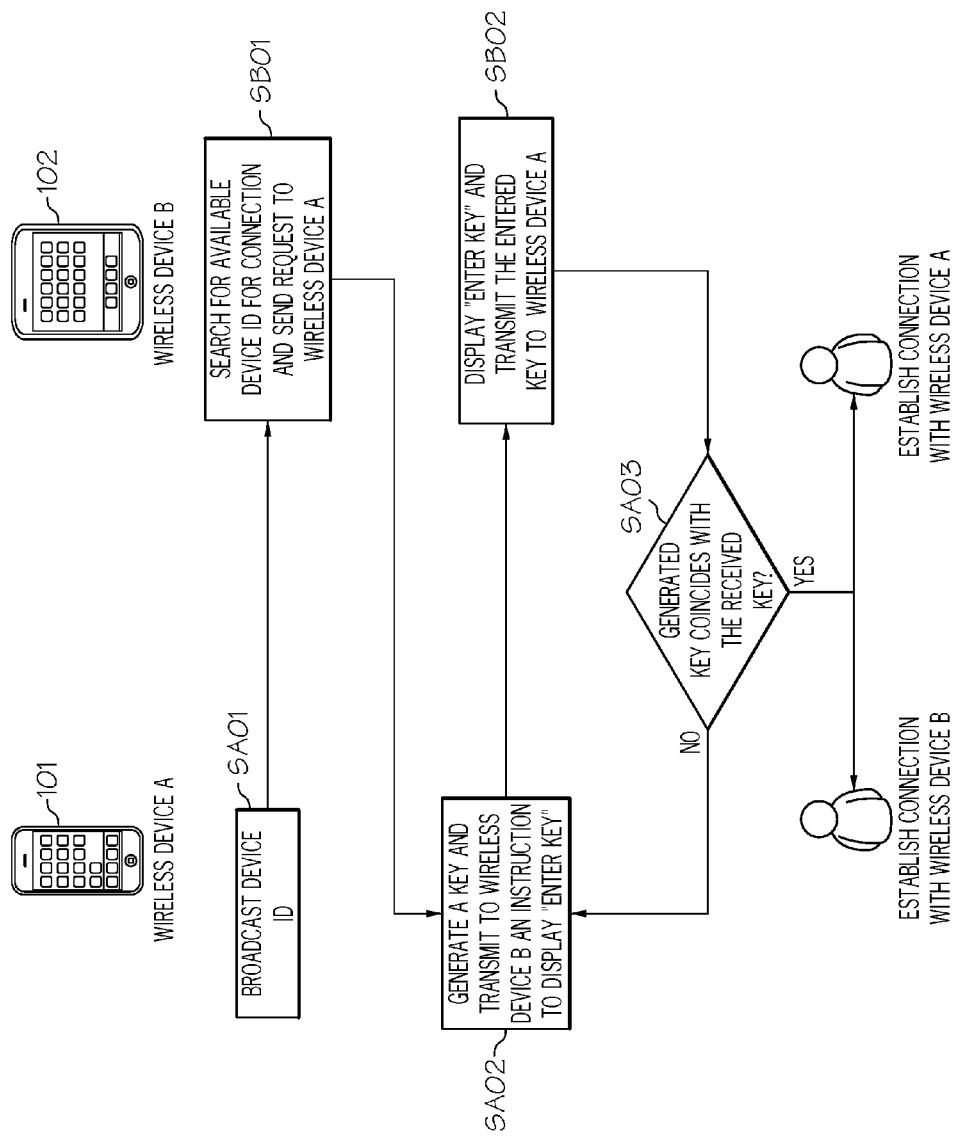
FIG. 1 illustrates a process for establishing an authenticated wireless connection between short-range wireless terminals.
Figure 3:
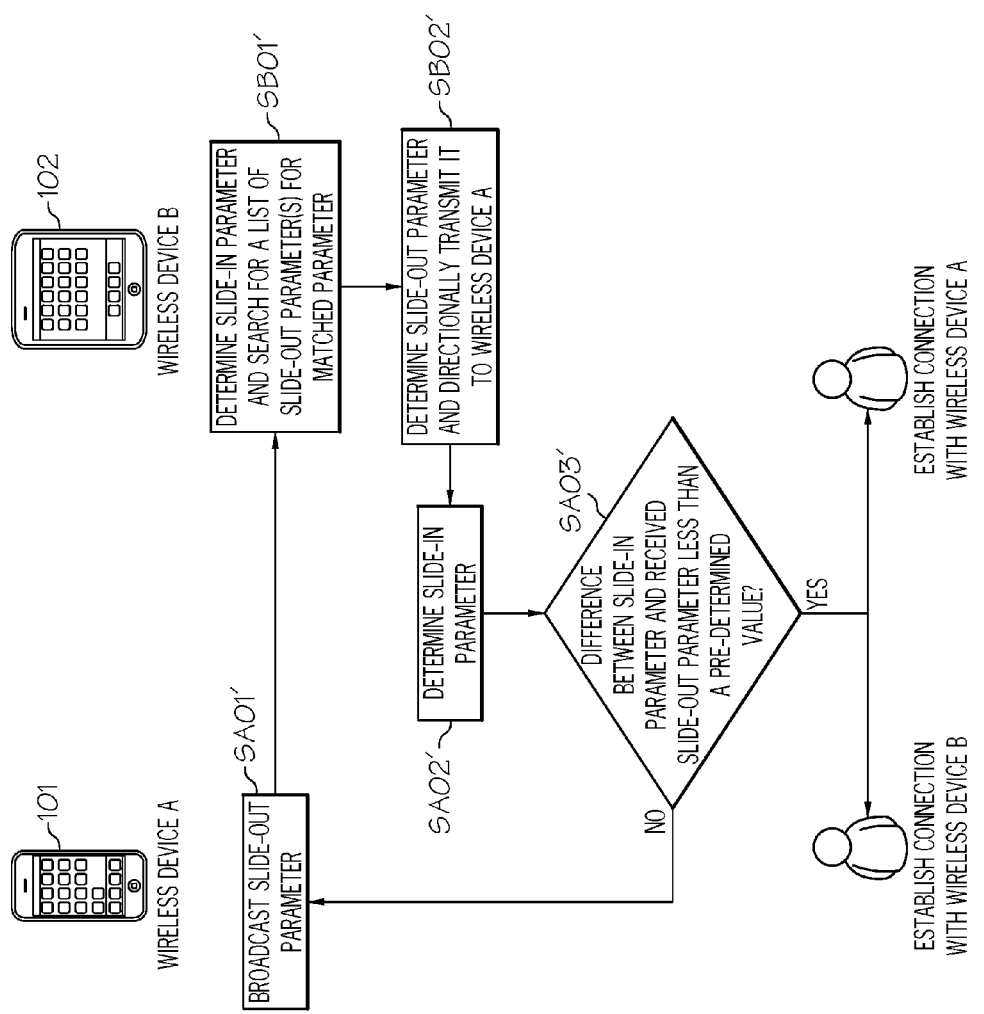
FIG. 3 illustrates a process for establishing an authenticated wireless connection between short-range wireless terminals according to an embodiment of the present invention.
Figure 5:
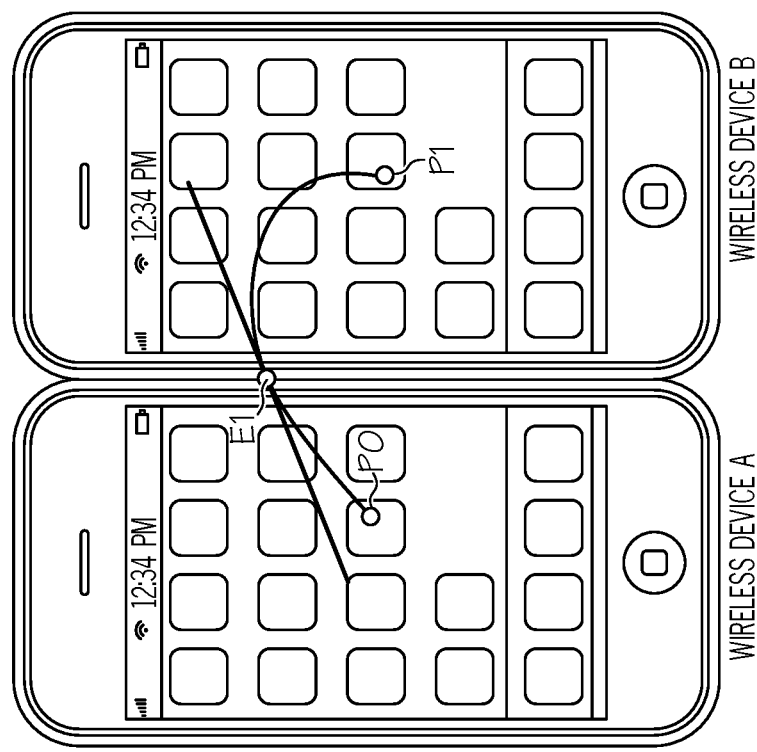
FIG. 5 illustrates a first half of the user operation trace in FIG. 4 according to an embodiment of the present invention.
Figure 6:
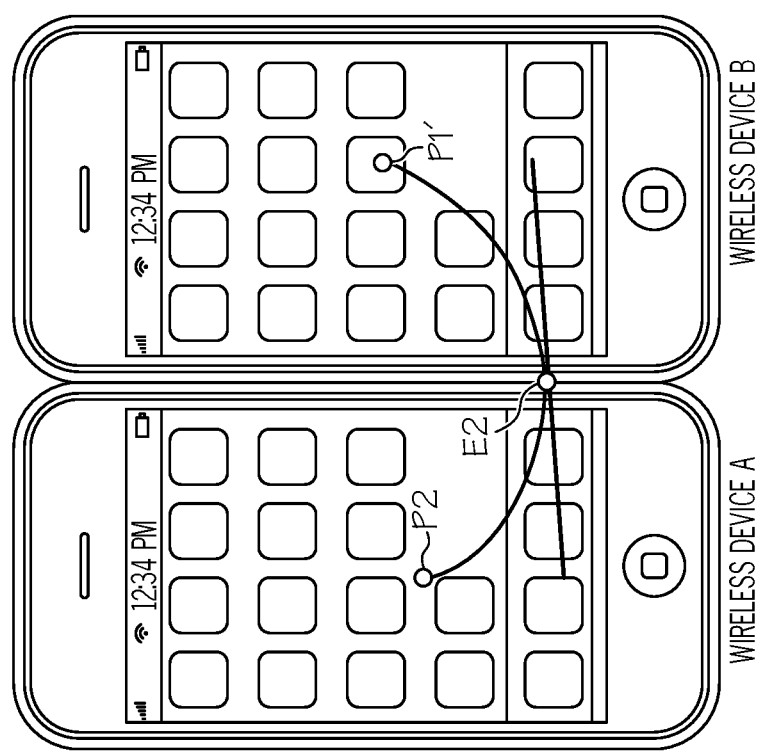
FIG. 6 illustrates a second half of the user operation trace in FIG. 4 according to an embodiment of the present invention.

Next, an embodiment of the present invention is expounded in details with reference to FIGS. 3, 5 and 6.

FIG. 5 illustrates a first half of the user operation trace in FIG. 4 in accordance with an embodiment of the present invention. Referring to FIG. 5, in conjunction with FIG. 4, an object, such as a user's finger or stylus, slides (generally referring to contacted sliding or suspended sliding) from a point P0 on the display area of wireless device A to point E1 on a boundary between wireless device A and wireless device B, and then slides from point E1 to a point P1 on the display area of wireless device B.

FIG. 3 illustrates the process for establishing an authenticated wireless connection between short-range wireless terminals according to an embodiment of the present invention. Referring to FIG. 3, in conjunction with FIGS. 4 and 5, in step SA01', when an object, such as a user's finger or stylus, slides from point P0 on the display area of wireless device A to point E1 on the boundary between wireless device A and wireless device B, wireless device A senses the time, timeAE1, when sliding to E1 and an angle, angleAE1, between the slide arc and a tangent when sliding to E1. Next, wireless device A sets the sensed timeAE1 and angleAE1 in a general wireless protocol message to be broadcasted, according to the general wireless protocol.

The existing general wireless protocol has two forms. The first form includes extended fields, for instance:

| Device ID Field | Device Address Field | Other fixed field | (Extended Field) timeAE1 | (Extended Field) angleAE1 |
|---|---|---|---|---|

Here, the sensed timeAE1 and angleAE1 are set into the extended fields, and then the message is broadcasted. For instance, the content of the extended field timeAE1 is 20101013121103045, and the content of the extended field angleAE1 is 134. This represents that the sensed timeAE1 is 12:11:3.045, Oct. 13, 2010, and the sensed angleAE1 is 13.4°.

The other form includes no extended field, where the sensed timeAE1 and angleAE1 are encoded in the device ID field and transferred together with the device ID. For instance:

| Device ID Field | Device Address Field | Other fixed field |
|---|---|---|
| <Device Initial ID>_<timeAE1>_<angleAE1> | | |

Under such a circumstance, a device ID field may be MyDevice_20101013121103045¬_134. That is to say, the initial ID of the device is MyDevice, the sensed timeAE1 is 12:11:3.045, Oct. 13, 2010, and the sensed angleAE1 is 13.4°.

Since this message is broadcasted, it can be received by other wireless devices within the range of the short-range wireless communication. Said broadcast is a periodic broadcast (triggered broadcast), that is, a broadcast which is performed only when a certain event occurs. Upon receiving the message, the wireless device stores the message or the timeAE1 and angleAE1 carried by the message in a local memory. In this way, a list of received timeAE1(s) and angleAE1(s) will be formed in the memory of any of the wireless devices.

In step SB01', an object, such as a user's finger or stylus, slides from point E1 to point P1 on the display area of wireless device B. When an object, such as a user's finger or stylus, just slides from E1 in the display area of wireless device B, wireless device B immediately senses the time, timeBE1, when sliding in from E1 and an angle, angleBE1, between the slide arc and the tangent when sliding in from E1.

Theoretically speaking, if the display area of wireless device A is in a seamless side-by-side connection with that of wireless device B, a difference between the time, timeAE1, when sliding to E1, as sensed by wireless device A, and the time, timeBE1, when sliding in from E1, as sensed by wireless device B, should be infinitesimal, and a difference between the angle, angleAE1, between the slide arc and the tangent when sliding to E1, as sensed by wireless device A, and the angle, angleBE1, between the slide arc and the tangent when sliding in from E1, as sensed by wireless device B, should be infinitesimal.

However, it is difficult to connect the display area of wireless device A and the display area of wireless device B in a seamless side-by-side way due to the presence of frames of wireless device A and wireless device B. Besides, in reality, there exists disturbances and other influences. Nevertheless, generally, timeBE1−timeAE1 (0, timediffE1) and angleBE1−angleAE1 (angledevE1Lower, angledevE1Upper), where the timediffE1, angledevE1Lower, and angledevE1Upper are threshold values experientially set by those skilled in the art.

Preferably, the threshold timediffE1 can be any threshold value in an interval (0 ms, 3000 ms). And more preferably, the threshold timediffE1 is 500 ms.

Preferably, the threshold angledevE1Lower can be any threshold value in an interval (−45°, 0°). And more preferably, the threshold angledevE1Lower is −10°.

Preferably, the threshold angledevE1Upper can be any threshold value in an interval (0°, 45°). And more preferably, the threshold angledevE1upper is 10°.

Examples of the above-mentioned threshold values are only general and illustrative values. Depending on the size of the frame of the wireless device, the ranges for these values may be different for different wireless devices and can be adjusted by the user according to his or her experiences in the art.

On the basis of the sensed timeBE1 and angleBE1, wireless device B searches the list of received timeAE1(s) and angleBE1(s) for the timeAE1 and angleAE1 that satisfy such a condition that timeBE1−timeAE1∈(0, timediffE1) and angleBE1−angleAE1∈(angledevE1Lower, andgledevE1Upper). When the timeAE1 and angleAE1 are found to satisfy the above-mentioned condition, wireless device B takes the wireless device A corresponding to the timeAE1 and angleAE1 as the wireless device with which wireless device B intends to establish a connection. In other words, sliding from P0 through E1 to P1 accomplishes a process corresponding to the process (a), and thus mitigates such a burden that a user needs to find a device ID of the wireless device with which a connection is desired from a large number of unreadable, meaningless, or homonymic device IDs in a very long device ID list. It takes full advantageous of the characteristics of the short-range wireless communication, such as, the communication range is small and wireless devices are easily put together, and accomplishes the process of searching for a target wireless device by simply sliding across a boundary between two wireless devices.

FIG. 6 illustrates a second half of the user operation trace in FIG. 4 in accordance with an embodiment of the present invention. Referring to FIG. 6, in conjunction with FIG. 4, an object, such as a user's finger or stylus, slides from point P1 to point E2 on a boundary between wireless device A and wireless device B, and then slides from point E2 to point P2 on the display area of wireless device A.

Referring to FIG. 3, in conjunction with FIGS. 4 and 6, in step SB02', when an object, such as a user's finger or stylus, slides from point P1 to point E2 on a boundary between wireless device A and wireless device B, wireless device B senses the time, timeBE2, when sliding to E2, the angle, angleBE2, between the slide arc and the tangent when sliding to E2, and the distance, boundaryBele2, between E1 and E2. Next, wireless device B sets the sensed timeBE2, angleBE2 and boundaryBele2 in a general wireless protocol message to be directionally transmitted to wireless device A according to the general wireless protocol, because wireless device A is the wireless device with which wireless device B intends to establish a connection. The approach of setting timeBE2, angleBE2 and boundaryBele2 in the general wireless protocol message is similar to the aforementioned approach of setting timeAE1 and angleAE1 in the general wireless protocol message.

Wireless device A receives the timeBE2, angleBE2 and boundaryBele2 that are transmitted from wireless device B.

In step SA02', an object, such as a user's finger or stylus, slides from the point E2 to a point P2 on the display area of wireless device A. When the object, such as a user's finger or stylus, slides in from E2 into the display area of wireless device A, wireless device A senses, immediately, the time, timeAE2, when sliding in from E2, the angle, angleAE2, between the slide arc and the tangent when sliding in from E2, and the distance, boundaryAele2, between E1 and E2.

Theoretically speaking, if the display area of wireless device A is in a seamless side-by-side connection with that of wireless device B, a difference between the time, timeBE2, when sliding to E2, as sensed by wireless device B, and the time, timeAE2, when sliding in from E2, as sensed by wireless device A, should be infinitesimal, and a difference between the angle, angleBE2, between the slide arc and the tangent when sliding to E2, as sensed by wireless device B, and the angle, angleAE2, between the slide arc and the tangent when sliding in from E2, as sensed by wireless device A, should be infinitesimal, and a difference between the distance boundaryBele2 between E1 and E2, as sensed by wireless device B, and the distance boundaryAele2 between E1 and E2, as sensed by wireless device A, should be infinitesimal.

However, it is difficult to connect the display area of wireless device A and the display area of wireless device B in a seamless side-by-side way due to the presence of the frames of wireless device A and wireless device B. Besides, in reality, there exists disturbances and other influences. Nevertheless, generally speaking, timeAE2−timeBE2 (0, timediffE2), angleAE2−angleBE2 (angledevE2Lower, angledevE2Upper), and boundaryBele2−boundaryAele2 (distancedevLower, distancedevUpper), where the timediffE2, angledevE2Lower, angledevE2Upper, distancedevLower and distancedevUpper are threshold values experientially set by those skilled in the art.

Preferably, the threshold timediffE2 can be any threshold value in an interval (0 ms, 3000 ms). And more preferably, the threshold timediffE2 is 500 ms.

Preferably, the threshold angledevE2Lower can be any threshold value in an interval (−45°, 0°). And more preferably, the threshold angledevE2Lower is −10°.

Preferably, the threshold angledevE2Upper can be any threshold value in an interval (0°, 45°). And more preferably, the threshold angledevE2Upper is 10°.

Preferably, the threshold distancedevLower can be any threshold value in an interval (−60 mm, 0 mm). And more preferably, the threshold distancedevLower is −15 mm.

Preferably, the threshold distancedevUpper can be any threshold value in an interval (0 mm, 60 mm). And more preferably, the threshold distancedevUpper is 15 mm.

The examples of the above-mentioned threshold values are only general and illustrative values. Depending on the size of the frame of the wireless device, the ranges of these values may be different for different wireless devices and can be adjusted by the user according to his or her experiences in the art.

Wireless device A compares the sensed timeAE2, angleAE2 and boundaryAele2 with the received timeBE2, angleBE2 and boundaryBele2. If timeAE2−timeBE2∈(0, timediffE2), angleAE2−angleBE2∈(angledevE2Lower, angledevE2Upper), and boundaryBele2−boundaryAele2∈ (distancedevLower, distancedevUpper), wireless devices A and B are regarded as being successfully paired. That is to say, a pairing process corresponding to the process (b) is accomplished. From the present embodiment, such complicated procedures involving wireless device A generating a key, the user of wireless device A notifying the user of wireless device B of the key, and the user of wireless device B entering the key and sending the key back to wireless device A for verification, are avoided.

Taking advantage of the characteristics of the short-range wireless communication, such as, the communication range is small and wireless devices are easily put together, in the present embodiment, two wireless devices are placed side by side, sliding from the display area of one wireless device to the display area of the other wireless device and then sliding back to the display area of the initial one, thus accomplishing the processes of searching of a target wireless device and pairing, and largely simplifying the process of establishing an authenticated wireless connection between short-range wireless terminals.

Referring to FIGS. 3-6, according to another embodiment of the present invention, in step SA01', when an object, such as a user's finger or stylus, slides from point P0 on the display area of wireless device A to point E1 on the boundary between wireless device A and wireless device B, wireless device A senses the time, timeAE1, when sliding to E1 and the speed, speedAE1, when sliding to E1, and sets them into a general wireless protocol message to be broadcasted, according to the wireless protocol. In step SB01', wireless device B senses the time, timeBE1, when sliding in from E1 and the speed, speedBE1, when sliding in from E1. When timeBE1−timeAE1∈(0, timediffE1) and speedBE1−speedAE1∈(speeddevE1Lower, speeddevE1Upper), wireless device B deems that wireless device A with which it intends to establish a connection is found, where similarly to the aforementioned timediffE1, angledevE1Lower and angledevE1Upper, timediffE1, speeddevE1Lower and speeddevE1Upper can be experientially set by those skilled in the art, and thus detailed descriptions thereof are omitted. In step SB02', when an object, such as a user's finger or stylus, slides from point P1 to point E2 on the boundary between wireless device A and wireless device B, wireless device B senses the time, timeBE2, when sliding to E2, the speed, speedBE2, when sliding to E2, and the distance, boundaryBele2, between E1 and E2, which are directionally transmitted to wireless device A. In step SA02', wireless device A senses the time, timeAE2, when sliding in from E2, the speed, speedAE2, when sliding in from E2, and the distance, boundaryAele2, between E1 and E2. When timeAE2−timeBE2∈(0, timediffE2), speedAE2−speedBE2∈ (speeddevE2Lower, speeddevE2Upper), and boundaryBele−boundaryAele2∈(distancedevLower, distancedevUpper), wireless devices A and B are regarded as being successfully paired. TimediffE2, speeddevE2Lower, speeddevE2Upper, distancedevLower and distancedevUpper can be experientially set by those skilled in the art and thus detailed descriptions thereof are omitted.

According to another embodiment of the present invention, in step SA01', when an object, such as a user's finger or stylus, slides from point P0 on the display area of wireless device A to point E1 on the boundary between wireless device A and wireless device B, wireless device A senses the angle, angleAE1, between the slide arc and the tangent when sliding to E1, the acceleration, accelerationAE1, when sliding to E1, the contact temperature, temperatureAE1, when sliding to E1, and the contact pressure, pressureAE1, when sliding to E1, and sets them into a general wireless protocol message to be broadcasted, according to the general wireless protocol. In step SB01', wireless device B senses the angle, angleBE1, between the slide arc and the tangent when sliding in from E1, the acceleration, accelerationBE1, when sliding in from E1, the contact temperature, temperatureBE1, when sliding in from E1, and the contact pressure, pressureBE1, when sliding in from E1. When angleBE1−angleAE1ϵ(angledevE1Lower, angledevE1Upper), accelerationBE1−accelerationAE1ϵ(accelerationdevE1Lower, accelerationdevE1Upper), temperatureBE1−temperatureAE1ϵ(temperaturedevE1Lower, temperaturedevE1Upper), and pressureBE1−pressureAE1ϵ (pressuredevE1Lower, pressuredevE1Upper), wireless device B deems that the wireless device A with which it intends to establish a connection, is found, where, similarly to the aforementioned timediffE1, angledevE1Lower and angledevE1Upper, angledevE1Lower, angledevE1Upper, accelerationdevE1Lower, acccelerationE1Upper, temperaturedevE1Lower, temperaturedevE1Upper, pressuredevE1Lower and pressuredevE1Upper can be experientially set by those skilled in the art, and thus detailed descriptions thereof are omitted. In step SB02', when an object, such as a user's finger or stylus, slides from point P1 to point E2 on the boundary between wireless device A and wireless device B, wireless device B senses the angle, angleBE2, between the slide arc and the tangent when sliding to E2, the acceleration, accelerationBE2, when sliding to E2, the contact temperature, temperatureBE2, when sliding to E2, and the contact pressure, pressureBE2, when sliding to E2, and directionally transmits them to wireless device A. In step SA02', wireless device A senses the angle, angleAE2, between the slide arc and the tangent when sliding in from E2, the acceleration, accelerationAE2, when sliding in from E2, the contact temperature, temperatureAE2, when sliding in from E2, and the contact pressure, pressureAE2, when sliding in from E2. When angleAE2−angleBE2ϵ(angledevE2Lower, angledevE2Upper), accelerationAE2−accelerationBE2ϵ(accelerationdevE2Lower, accelerationdevE2Upper), temperatureAE2−temperatureBE2ϵ(temperaturedevE2Lower, temperaturedevE2Upper), and pressureAE2−pressureBE2ϵ (pressuredevE2Lower, pressuredevE2Upper), wireless device A and wireless device B are regarded as being successfully paired. The angledevE2Lower, angledevE2Upper, accelerationdevE2Lower, acceleraetiondevE2Upper, temperaturedevE2Lower, temperaturedevE2Upper, pressuredevE2Lower and pressuredevE2Upper can be experientially set by those skilled in the art, and detailed descriptions thereof are omitted.

The present invention is not limited to the aforementioned embodiments. As a matter of fact, in step SA01', when an object, such as a user's finger or stylus, slides from point P0 on the display area of wireless device A to point E1 on the boundary between wireless device A and wireless device B, the object of the present invention can be achieved as long as the slide-out parameter sensed by wireless device A is selected from one or more the following parameters: the time when sliding off the edge of the touch screen of wireless device A, the angle between the slide arc and the tangent when sliding off the edge of the touch screen of wireless device A, the speed when sliding off the edge of the touch screen of wireless device A, the acceleration when sliding off the edge of the touch screen of wireless device A, the contact temperature when sliding off the edge of the touch screen of wireless device A, the contact pressure when sliding off the edge of the touch screen of wireless device A, and any other slide-out parameter.

Correspondingly, in step SB01', the slide-in parameter sensed by wireless device B is selected from one or more of the following parameters: the time when sliding in through the edge of the touch screen of wireless device B, the angle between the slide arc and the tangent when sliding in through the edge of the touch screen of wireless device B, the speed when sliding in through the edge of the touch screen of wireless device B, the acceleration when sliding in through the edge of the touch screen of wireless device B, the contact temperature when sliding in through the edge of the touch screen of wireless device B, the contact pressure when sliding in through the edge of the touch screen of wireless device B, and any other slide-in parameter.

If the difference between the slide-in parameter as sensed by wireless device B and the slide-out parameter as sensed by wireless device A is less than the predetermined value, then the slide-in parameter as sensed by wireless device B matches the slide-out parameter transmitted from wireless device A. That is, wireless device B finds the wireless device A with which it intends to establish a physical connection.

Accordingly, in step SB02', when an object, such as a user's finger or stylus, slides from a point P1 to a point E2 on the boundary between wireless device A and wireless device B, the slide-out parameter sensed by wireless device B is selected from one or more of the following parameters: the time when sliding off the edge of the touch screen of wireless device B, the angle between the slide arc and the tangent when sliding off the edge of the touch screen of wireless device B, the speed when sliding off the edge of the touch screen of wireless device B, the acceleration when sliding off the edge of the touch screen of wireless device B, the contact temperature when sliding off the edge of the touch screen of wireless device B, the contact pressure when sliding off the edge of the touch screen of wireless device B, and the difference between the slide-in position and the slide-out position for wireless device B.

Correspondingly, in step SA02', the slide-in parameter sensed by wireless device A is selected from one or more of the following parameters: the time when sliding in through the edge of the touch screen of wireless device A, the angle between the slide arc and the tangent when sliding in through the edge of the touch screen of wireless device A, the speed when sliding in through the edge of the touch screen of wireless device A, the acceleration when sliding in through the edge of the touch screen of wireless device A, the contact temperature when sliding in through the edge of the touch screen of wireless device A, the contact pressure when sliding in through the edge of the touch screen of wireless device A, and the difference between the slide-out position and the slide-in position for wireless device A.

In step SA03', a determination is made as to whether the difference between the slide-in parameter determined in step SA02' and the received slide-out parameter from wireless device B is less than the predetermined value. If the difference between the determined slide-in parameter and the received slide-out parameter is not less than the predetermined value, then step SA01' is repeated as discussed above. If the difference between the determined slide-in parameter and the received slide-out parameter is less than the predetermined value, then a match between the determined slide-in parameter and the received slide-out parameter from wireless device B is said to occur thereby indicating a successful pairing between wireless device A and wireless device B.

Figure 7:
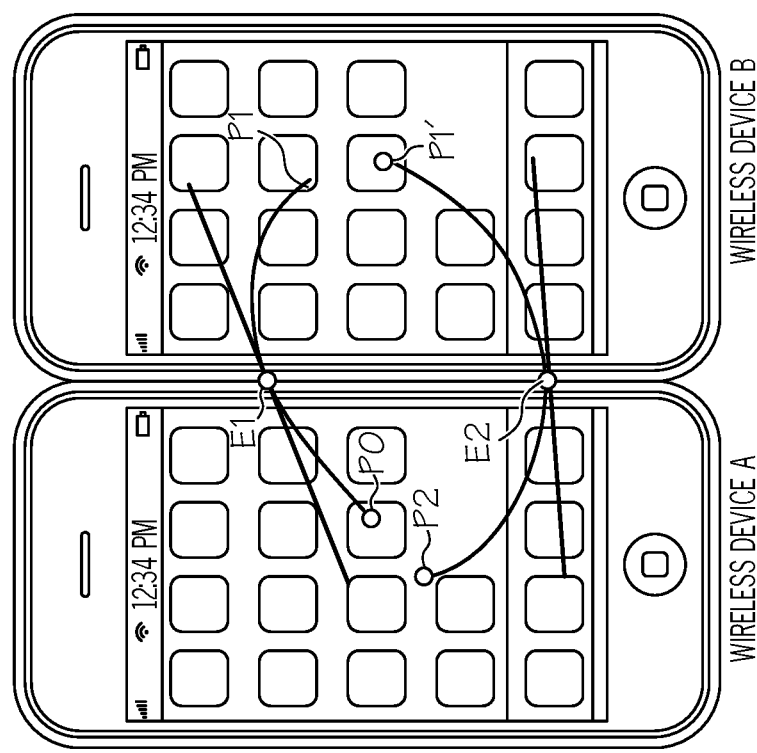
FIG. 7 illustrates operations performed by a user on the touch screen of the wireless device according to another embodiment of the present invention.

FIG. 7 illustrates operations performed by a user on a touch screen of the wireless device according to another embodiment of the present invention. FIG. 7 differs from FIG. 4 in that P1 in FIG. 4 becomes two separated points P1 and P1' in FIG. 7. In other words, an object, such as a user's finger or stylus, slides from point P0 on the display area of wireless device A to point E1 on the boundary between wireless device A and wireless device B, and then to point P1 on the display area of wireless device B. Then, an object, such as a user's finger or stylus, slides from another point P1' on the display area of wireless device B through point E2 on the boundary between wireless device A and wireless device B to point P2 on the display area of wireless device A. P1 and P1' are separated points.

From the aforementioned process of implementing embodiments of the present invention, it is clear that as long as a slide trace of an object, such as a user's finger or stylus, is continuous when passing through E1 and E2, the process for searching for a target wireless device and pairing can be achieved by comparing the slide-out parameter(s) before sliding through E1 or E2 and the slide-in parameter(s) after sliding through E1 or E2. Consequently, the discontinuity between P1 and P1' does not influence the achievement of the object of the present invention. The process of implementing the embodiment concerned in FIG. 7 is similar to that concerned in FIG. 4.

FIG. 8 illustrates an apparatus 800, as a connection initiating party of a wireless communication, for establishing a wireless connection based on a touch screen of a wireless device according to an aspect of the present invention, comprising: a first slide-out processing section 801 for determining a first slide-out parameter for determining by the other wireless device an object to be connected, in response to a slide-out from an edge of the touch screen, and broadcasting said first slide-out parameter; a first slide-in processing section 802 for determining a slide-in parameter in response to a slide-in from the edge of the touch screen and a reception of a second slide-out parameter directionally transmitted from the other wireless device, and if the determined slide-in parameter matches said second slide-out parameter, establishing a wireless connection between said wireless device and said other wireless device.

As an implementation, said directional transmission is identified by the use of a destination address field in the general wireless protocol.

FIG. 9 illustrates an apparatus 900, as a connected party of wireless communication, for establishing a wireless connection based on a touch screen of wireless device according to another aspect of the present invention, comprising: a second slide-in processing section 901 for determining a slide-in parameter in response to a slide-in from an edge of the touch screen and searching a list of received first slide-out parameter(s) for a matched first slide-out parameter so as to find a matched wireless device having the matched first slide-out parameter, wherein the list of first slide-out parameter(s) includes all the first slide-out parameters received by said wireless device, which are broadcasted by the other wireless device, for determining by the wireless device an object to be connected; a second slide-out processing section 902 for determining a second slide-out parameter in response to a slide-out from the edge of the touch screen, and directionally transmitting the second slide-out parameter to the matched wireless device which is determined by the second slide-out processing section.

Figure 10:
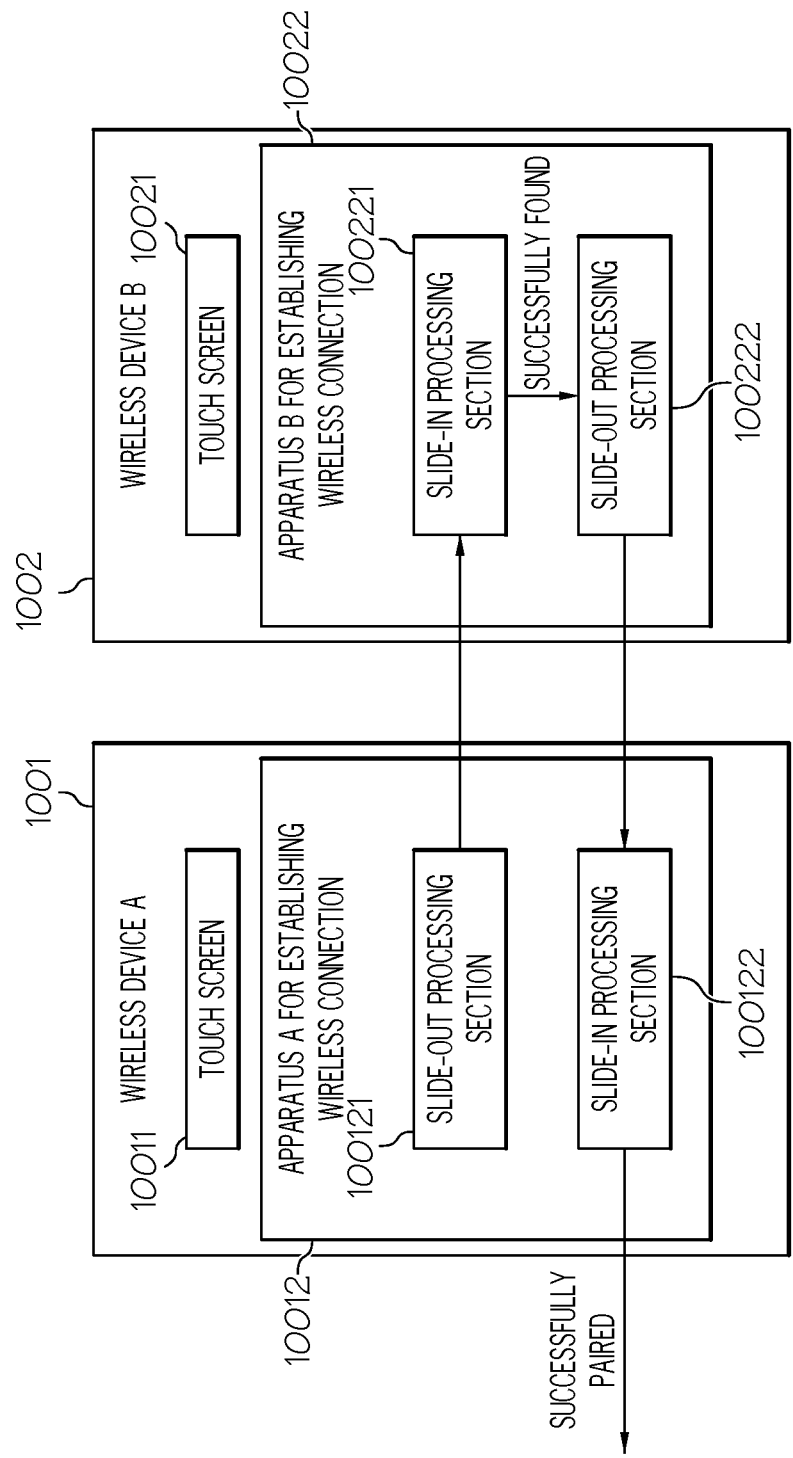
FIG. 10 illustrates a compositional structure of a wireless device and the interactions between two wireless devices for establishing an authenticated wireless connection therebetween according to an embodiment of the present invention.

Nevertheless, the apparatus for establishing a wireless connection based on the touch screen of the wireless device generally can function as either a connection initiating party or a connected party. FIG. 10 illustrates such instance in accordance with an embodiment of the present invention. Wireless device A 1001 comprises touch screen 10011 and apparatus A 10012 for establishing a wireless connection. Wireless device B 1002 includes touch screen 10021 and apparatus B 10022 for establishing a wireless connection. Apparatus A 10012 for establishing an authenticated wireless connection comprises a slide-out processing section 100121 and a slide-in processing section 100122. Apparatus B 10022 for establishing an authenticated wireless connection comprises a slide-in processing section 100221 and a slide-out processing section 100222. The function of the slide-out processing section 100121 is the same as that of the slide-out processing section 100222, namely: determining a slide-out parameter in response to a slide-out from an edge of touch screen, and judging whether a directional transmission indication is present or not, and if not, broadcasting said slide-out parameter, while if present, directionally transmitting said slide-out parameter to a target wireless device. The function of the slide-in processing section 100122 is the same as that of the slide-in processing section 100221, namely: setting a received slide-out parameter broadcasted from other wireless device into a list of slide-out parameter(s), determining a slide-in parameter in response to a slide-in from the edge of touch screen, and judging whether a slide-out parameter directionally transmitted from other wireless device is received simultaneously, if not received, searching the list of slide-out parameter(s) for a slide-out parameter matching the slide-in parameter and generating a directional transmission indication which takes the wireless device that transmits the slide-out parameter matching the slide-in parameter as a target wireless device, while if received, judging whether the received directionally-transmitted slide-out parameter matches the determined slide-in parameter, and establishing a wireless connection between said wireless device and said target wireless device if it matches.

Referring to FIG. 10, in conjunction with FIG. 3, in step SA01', when an object, such as a user's finger or stylus, slides from point P0 on the display area of wireless device A to point E1 on the boundary between wireless device A and wireless device B, the slide-out processing section 100121 senses slide-out parameter(s) at E1. At this point, the slide-out processing section 100121 judges whether a directional transmission indication is present or not. The result from the judging is "Not". Consequently, the slide-out processing section 100121 sets the sensed slide-out parameter(s) into a general wireless protocol message to be broadcasted, according to the general wireless protocol.

The slide-in processing section 100221 sets a received slide-out parameter broadcasted from wireless device A 1001 in a list of slide-out parameters. In step SB01', when an object such as a user's finger or stylus, just slides from point E1 in the display area of wireless device B, the slide-in processing section 100221 immediately senses an slide-in parameter at E1. At this point, the slide-in processing section 100221 judges whether a slide-out parameter directionally transmitted from other wireless device is received simultaneously. The result from the judging is "Not received". Consequently, the slide-in processing section 100221 searches the list of slide-out parameter(s) for a slide-out parameter matching the slide-in parameter, and generates a directional transmission indication which takes wireless device A that transmits the slide-out parameter matching the slide-in parameter as a target wireless device. That is to say, wireless device A that transmits the matched slide-out parameter is just the wireless device with which wireless device B intends to establish a connection.

In step SB02', when an object, such as a user's finger or stylus, slides from point P1 to point E2 on the boundary between wireless device A and wireless device B, the slide-out processing section 100222 senses a slide-out parameter when sliding to E2. The slide-out processing section 100222 judges whether a directional transmission indication is present or not. The result from the judging is "Yes". Consequently, the slide-out processing section 100222 directionally transmits, according to the directional transmission indication generated in the slide-in processing section 100221, the slide-out parameter to a target wireless device A. Among the fields in a format of a general wireless protocol message, there exists a destination address field. If the message is directionally transmitted, a destination address is set in the destination address field, on the other hand, if the message is broadcasted, the destination address field is set null or as a fixed symbol.

In step SA02', the slide-in processing section 100122 senses a slide-in parameter in response to a slide-in of an object such as a user's finger or stylus from E2 into the display area of wireless device A. At this point, the slide-in processing section 100122 judges whether a slide-out parameter directionally transmitted from other wireless device is received simultaneously. The result from the judging is a slide-out parameter directionally transmitted from wireless device B is received simultaneously. At this point, the slide-in processing section 100122 judges in step SA03' whether the received directionally-transmitted slide-out parameter matches the sensed slide-in parameter. If it matches, a wireless connection between wireless device A and wireless device B is established; while if not match, it is not allowed to establish a wireless connection between wireless device A and wireless device B.

Figure 11:
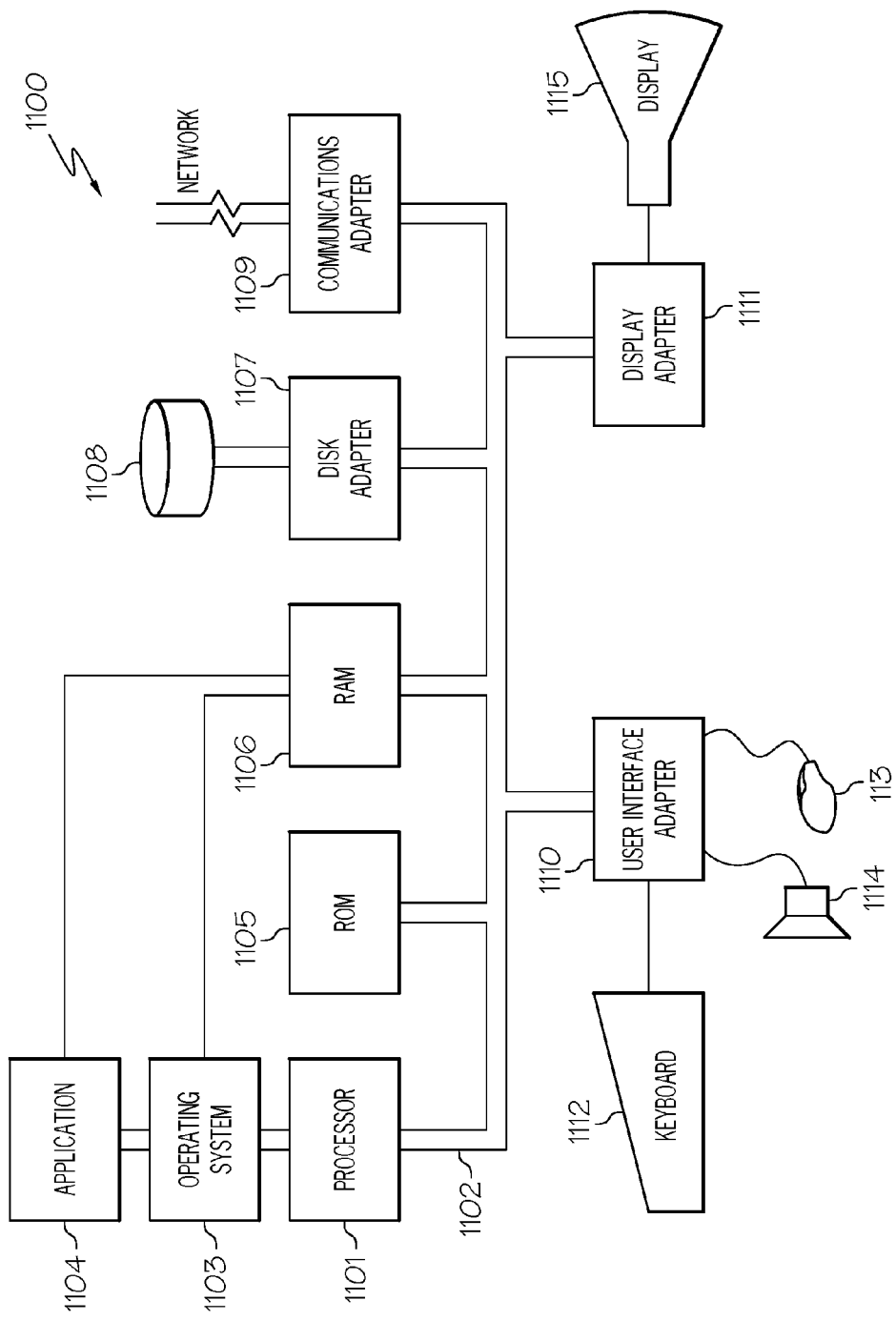
FIG. 11 depicts an embodiment of a hardware configuration of a wireless device which is representative of a hardware environment for practicing the present invention.

FIG. 11 depicts an embodiment of a hardware configuration of a wireless device 1100 (e.g., wireless devices 101, 102, 1001, 1002) which is representative of a hardware environment for practicing the present invention. Referring to FIG. 11, wireless device 1100 has a processor 1101 coupled to various other components by system bus 1102. An operating system 1103 may run on processor 1101 and provide control and coordinate the functions of the various components of FIG. 11. An application 1104 in accordance with the principles of the present invention may run in conjunction with operating system 1103 and provide calls to operating system 1103 where the calls implement the various functions or services to be performed by application 1104. Application 1104 may include, for example, an application for establishing a wireless connection as discussed above.

Referring again to FIG. 11, read-only memory ("ROM") 1105 may be coupled to system bus 1102 and include a basic input/output system ("BIOS") that controls certain basic functions of wireless device 1100. Random access memory ("RAM") 1106 and disk adapter 1107 may also be coupled to system bus 1102. It should be noted that software components including operating system 1103 and application 1104 may be loaded into RAM 1106, which may be wireless device's 1100 main memory for execution. Disk adapter 1107 may be an integrated drive electronics ("IDE") adapter that communicates with a disk unit 1108, e.g., disk drive.

Wireless device 1100 may further include a communications adapter 1109 coupled to bus 1102. Communications adapter 1109 may interconnect bus 1102 with an outside network (not shown) thereby allowing wireless device 1100 to communicate with other similar devices.

I/O devices may also be connected to wireless device 1100 via a user interface adapter 1110 and a display adapter 1111. Keyboard 1112, mouse 1113 (e.g., mouse pad) and speaker 1114 may all be interconnected to bus 1102 through user interface adapter 1110. Data may be inputted to wireless device 1100 through any of these devices. A display monitor 1115 may be connected to system bus 1102 by display adapter 1111. In one embodiment, display monitor 1115 contains touch screen capability which detects a user's touch or an impression made from a stylus. In this manner, a user is capable of inputting to wireless device 1100 through keyboard 1112 or mouse 1113 and receiving output from wireless device 1100 via display 1115 or speaker 1114.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for establishing a wireless connection based on a touch screen of a wireless device, the method comprising:
   determining a slide-in parameter in response to a slide-in from an edge of the touch screen;
   searching a list of received first slide-out parameters for a first slide-out parameter matching the determined slide-in parameter so as to determine an other wireless device matching said wireless device, wherein the list of first slide-out parameters includes the first slide-out parameter received by said wireless device, which is broadcasted by said other wireless device, for determining, by said wireless device, an object to be connected;
   determining a second slide-out parameter in response to a slide-out from the edge of the touch screen; and
   directionally transmitting, by a processor, the second slide-out parameter to a matched wireless device.

2. The method as recited in claim 1, wherein the slide-in parameter is selected from one or more of the following parameters: a time when sliding in through the edge of the touch screen, an angle between a slide arc and a tangent when sliding in through the edge of the touch screen, a speed when sliding in through the edge of the touch screen, an acceleration when sliding in through the edge of the touch screen, a contact temperature when sliding in through the edge of the touch screen, and a contact pressure when sliding in through the edge of the touch screen.

3. The method as recited in claim 1, wherein the first slide-out parameter is selected from one or more of the following parameters: a time when sliding off the edge of the touch screen of said other wireless device, an angle between a slide arc and a tangent when sliding off the edge of the touch screen of said other wireless device, a speed when sliding off the edge of the touch screen of said other wireless device, an acceleration when sliding off the edge of the touch screen of said other wireless device, a contact temperature when sliding off the edge of the touch screen of said other wireless device, and a contact pressure when sliding off the edge of the touch screen of said other wireless device.

4. The method as recited in claim 1, wherein the second slide-out parameter is selected from one or more of the following parameters: a time when sliding off the edge of the touch screen, an angle between a slide arc and a tangent when sliding off the edge of the touch screen, a speed when sliding off the edge of the touch screen, an acceleration when sliding off the edge of the touch screen, a contact temperature when sliding off the edge of the touch screen, a contact pressure when sliding off the edge of the touch screen, and a difference between a slide-in position and a slide-out position for the touch screen of said wireless device.

5. The method as recited in claim 1, wherein the searching of the list of received first slide-out parameters for the first slide-out parameter matching the determined slide-in parameter is performed as follows: if a difference between the determined slide-in parameter and a certain received first slide-out parameter is less than a predetermined threshold value, the slide-in parameter is determined as matching the first slide-out parameter.

6. The method as recited in claim 1, wherein the slide-in from the edge of the touch screen and the slide-out from the edge of the touch screen are located in a same continuous trace.

7. The method as recited in claim 1, wherein the slide-in from the edge of the touch screen and the slide-out from the edge of the touch screen are located in different continuous traces.

8. A computer program product for establishing a wireless connection based on a touch screen of a wireless device, the computer program product comprising a computer readable storage medium having program code embodied therewith, the program code comprising the programming instructions for:
 determining a slide-in parameter in response to a slide-in from an edge of the touch screen;
 searching a list of received first slide-out parameters for a first slide-out parameter matching the determined slide-in parameter so as to determine an other wireless device matching said wireless device, wherein the list of first slide-out parameters includes the first slide-out parameter received by said wireless device, which is broadcasted by said other wireless device, for determining, by said wireless device, an object to be connected;
 determining a second slide-out parameter in response to a slide-out from the edge of the touch screen; and
 directionally transmitting the second slide-out parameter to a matched wireless device.

9. The computer program product as recited in claim 8, wherein the slide-in parameter is selected from one or more of the following parameters: a time when sliding in through the edge of the touch screen, an angle between a slide arc and a tangent when sliding in through the edge of the touch screen, a speed when sliding in through the edge of the touch screen, an acceleration when sliding in through the edge of the touch screen, a contact temperature when sliding in through the edge of the touch screen, and a contact pressure when sliding in through the edge of the touch screen.

10. The computer program product as recited in claim 8, wherein the first slide-out parameter is selected from one or more of the following parameters: a time when sliding off the edge of the touch screen of said other wireless device, an angle between a slide arc and a tangent when sliding off the edge of the touch screen of said other wireless device, a speed when sliding off the edge of the touch screen of said other wireless device, an acceleration when sliding off the edge of the touch screen of said other wireless device, a contact temperature when sliding off the edge of the touch screen of said other wireless device, and a contact pressure when sliding off the edge of the touch screen of said other wireless device.

11. The computer program product as recited in claim 8, wherein the second slide-out parameter is selected from one or more of the following parameters: a time when sliding off the edge of the touch screen, an angle between a slide arc and a tangent when sliding off the edge of the touch screen, a speed when sliding off the edge of the touch screen, an acceleration when sliding off the edge of the touch screen, a contact temperature when sliding off the edge of the touch screen, a contact pressure when sliding off the edge of the touch screen, and a difference between a slide-in position and a slide-out position for the touch screen of said wireless device.

12. The computer program product as recited in claim 8, wherein the searching of the list of received first slide-out parameters for the first slide-out parameter matching the determined slide-in parameter is performed as follows: if a difference between the determined slide-in parameter and a certain received first slide-out parameter is less than a predetermined threshold value, the slide-in parameter is determined as matching the first slide-out parameter.

13. The computer program product as recited in claim 8, wherein the slide-in from the edge of the touch screen and the slide-out from the edge of the touch screen are located in a same continuous trace.

14. The computer program product as recited in claim 8, wherein the slide-in from the edge of the touch screen and the slide-out from the edge of the touch screen are located in different continuous traces.

* * * * *